United States Patent
Arcilla et al.

(10) Patent No.: US 9,268,589 B2
(45) Date of Patent: Feb. 23, 2016

(54) METHOD AND SYSTEM FOR DEPLOYING MULTIPLE DISTRIBUTED APPLICATION STACKS ON A TARGET MACHINE

(75) Inventors: Andre Arcilla, San Jose, CA (US); Konstantin Boudnik, Castro Valley, CA (US); Roman V. Shaposhnik, Sunnyvale, CA (US)

(73) Assignee: YAHOO! INC., Sunnyvale, CA (US)

( * ) Notice: Subject to any disclaimer, the term of this patent is extended or adjusted under 35 U.S.C. 154(b) by 270 days.

(21) Appl. No.: 13/315,342

(22) Filed: Dec. 9, 2011

(65) Prior Publication Data

US 2013/0152078 A1  Jun. 13, 2013

(51) Int. Cl.
 *G06F 9/455* (2006.01)
 *G06F 9/46* (2006.01)
 *G06F 9/445* (2006.01)

(52) U.S. Cl.
 CPC .............. *G06F 9/45558* (2013.01); *G06F 8/60* (2013.01)

(58) Field of Classification Search
 None
 See application file for complete search history.

(56) References Cited

U.S. PATENT DOCUMENTS

| | | | |
|---|---|---|---|
| 7,107,350 B2* | 9/2006 | Godwin et al. | 709/230 |
| 7,577,722 B1* | 8/2009 | Khandekar et al. | 709/220 |
| 2002/0133602 A1* | 9/2002 | Godwin et al. | 709/229 |
| 2006/0059253 A1* | 3/2006 | Goodman et al. | 709/223 |
| 2007/0078988 A1* | 4/2007 | Miloushev et al. | 709/227 |
| 2008/0163194 A1* | 7/2008 | Dias et al. | 717/174 |
| 2008/0209016 A1* | 8/2008 | Karve et al. | 709/221 |
| 2008/0216006 A1* | 9/2008 | Jordan et al. | 715/771 |
| 2009/0037287 A1* | 2/2009 | Baitalmal et al. | 705/26 |
| 2009/0328033 A1* | 12/2009 | Kohavi et al. | 718/1 |
| 2010/0138830 A1* | 6/2010 | Astete et al. | 718/1 |
| 2010/0306286 A1* | 12/2010 | Chiu et al. | 707/827 |
| 2011/0161482 A1* | 6/2011 | Bonola et al. | 709/223 |
| 2011/0214115 A1* | 9/2011 | Kuusilinna et al. | 717/171 |
| 2013/0031542 A1* | 1/2013 | Arcilla et al. | 717/177 |

* cited by examiner

*Primary Examiner* — Meng An
*Assistant Examiner* — Bradley Teets
(74) *Attorney, Agent, or Firm* — Pillsbury Winthrop Shaw Pittman LLP

(57) ABSTRACT

Method, system, and programs for automatically deploying a plurality of distributed application stacks on a target machine. A plurality of virtual environments isolated from each other are first created on the target machine through which a user has access to a plurality of clusters. A distributed application stack is deployed from the plurality of distributed application stacks in a respective virtual environment created on the target machine. The plurality of distributed application stacks are deployed in the plurality of clusters. Based on the deployed distributed application stack, each of the virtual environments is then associated with a corresponding cluster.

15 Claims, 16 Drawing Sheets

METHOD AND SYSTEM FOR DEPLOYING MULTIPLE DISTRIBUTED APPLICATION STACKS ON A TARGET MACHINE

BACKGROUND

1. Technical Field

The present teaching relates to methods, systems, and programming for distributed computing. Particularly, the present teaching is directed to methods, systems, and programming for deploying a plurality of distributed application stacks on a target machine.

2. Discussion of Technical Background

Distributed computing is a field of computer science that studies distributed systems, which include multiple autonomous computers or parallel virtual machines that communicate through a computer network, such as a computer cluster having multiple nodes. The machines in a distributed system interact with each other in order to achieve a common goal. A computer program that runs in the distributed system is called a distributed application. In distributed computing, a problem is divided into many tasks, each of which is solved by one or more computers, such as the nodes of a computer cluster. Distributed systems and applications may be applied as various paradigms, including grid computing, utility computing, edge computing, and cloud computing by which users may access the server resources using a computer, netbook, tablet, smart phone, or other device through the Internet.

For instance, APACHE HADOOP is a software framework that supports data-intensive distributed applications under a free license. It enables applications to work with thousands of nodes and petabytes of data. Rather than rely on hardware to deliver high-availability, HADOOP is designed to detect and handle failures at the application layer, thereby delivering a highly-available service. HADOOP is deployed on a computer cluster in the form of a HADOOP stack, which includes a set of software artifacts (HADOOP components), such as HADOOP software, configuration files, libraries, links, source code, documentations, miscellaneous, etc. The deployment of HADOOP on a cluster of machines usually involves hardware installation, operating system installation, update, and configuration, JAVA installation and configuration, and HADOOP stack installation, configuration, and diagnostic.

When deploying a distributed application stack, such as HADOOP, server-side software artifacts of the distributed application stack need to be deployed on regular nodes of the cluster while certain client-side software artifacts need to be installed and configured on one or more special target machines (e.g., lightweight HADOOP clients) from which a user has access to the cluster and the deployed distributed application stack. The target machines include, for example, the users' client-side machines outside the cluster and some special nodes, such as a gateway node, of the cluster. Moreover, certain applications on the clusters, e.g., development and Quality Engineering (QE), may require deploying multiple (e.g., tens or hundreds of) distributed application stacks on the same physical target machine and isolating the deployed distributed application stacks from each other on the target machine. Therefore, there is a need to provide a solution for automated deployment of multiple independent distributed application stacks in isolated environments on a target machine, such that a user can access and interact with multiple clusters through the target machine.

SUMMARY

The present teaching relates to methods, systems, and programming for distributed computing. Particularly, the present teaching is directed to methods, systems, and programming for deploying a plurality of distributed application stacks on a target machine.

In one example, a method, implemented on at least one machine each of which has at least one processor, storage, and a communication platform connected to a network for automatically deploying a plurality of distributed application stacks on a target machine. A plurality of virtual environments isolated from each other are first created on the target machine through which a user has access to a plurality of clusters. A distributed application stack is deployed from the plurality of distributed application stacks in a respective virtual environment created on the target machine. The plurality of distributed application stacks are deployed in the plurality of clusters. Based on the deployed distributed application stack, each of the virtual environments is then associated with a corresponding cluster.

In a different example, a system for automatically deploying a plurality of distributed application stacks on a target machine is presented, which includes a deployment module and a virtual environment manager. The deployment module is configured to deploy a distributed application stack from the plurality of distributed application stacks in a virtual environment created on the target machine. The plurality of distributed application stacks are deployed in the plurality of clusters. The virtual environment manager is operatively coupled to the deployment module and is configured to create a plurality of virtual environments isolated from each other on the target machine through which a user has access to a plurality of clusters. The virtual environment manager is further configured to associate each of the virtual environments with a corresponding cluster based on the deployed distributed application stack.

Other concepts relate to software for automatically deploying a plurality of distributed application stacks on a target machine. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for automatically deploying a plurality of distributed application stacks on a target machine recorded thereon, wherein the information, when read by the machine, causes the machine to perform a series of steps. A plurality of virtual environments isolated from each other are first created on the target machine through which a user has access to a plurality of clusters. A distributed application stack is deployed from the plurality of distributed application stacks in a respective virtual environment created on the target machine. The plurality of distributed application stacks are deployed in the plurality of clusters. Based on the deployed distributed application stack, each of the virtual environments is then associated with a corresponding cluster.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of deploying a plurality of distributed application stacks on a target machine in a fully automated manner. The deployment method and system as disclosed herein aim at eliminating manual interventions in distributed application stack deployment in order to make the deployment more efficient and effective. Such method and system benefit users in several ways: for example, the isolated target machine deployment allows hundreds of independent HADOOP clients to coexist on a single physical machine, thereby greatly aiding the tasks of HADOOP stack usage, testing, and certification; the ability to share clusters via a separate target machine installation reduces the need for multiple development and QE clusters, since a single cluster may sometimes be shared by multiple users, whereas a target machine environment usually cannot; the sharing of the gateway node greatly reduces the number of machines that need to be excluded from the general node pool to be deployed as dedicated gateways and also reduces the demand for other supporting resources, such as IP addresses.

Figure 1A:
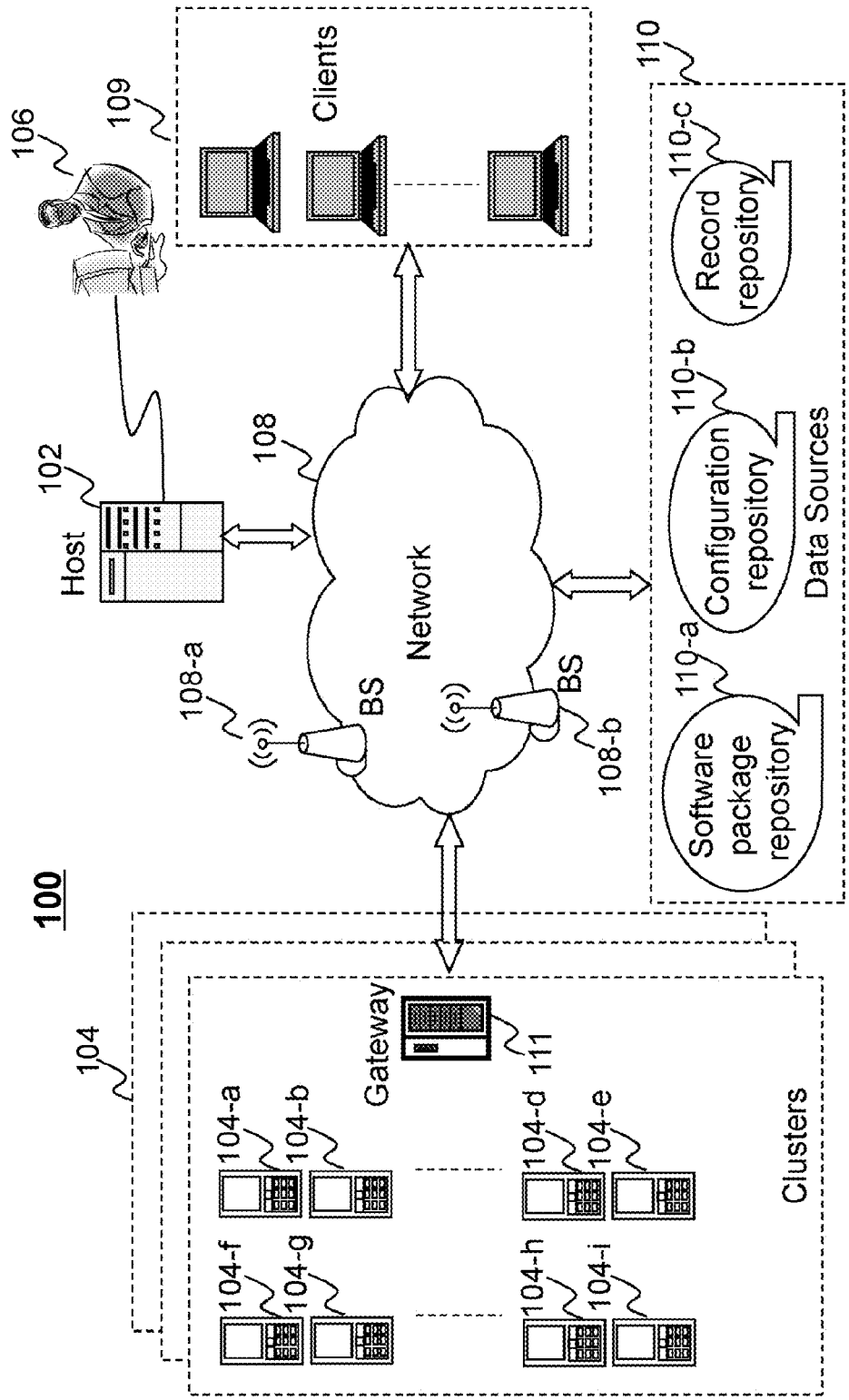
FIGS. 1(a)-1(c) depict exemplary embodiments of a networked environment in which multiple distributed application stacks deployment on a target machine is applied, according to an embodiment of the present teaching.
Figure 1B:
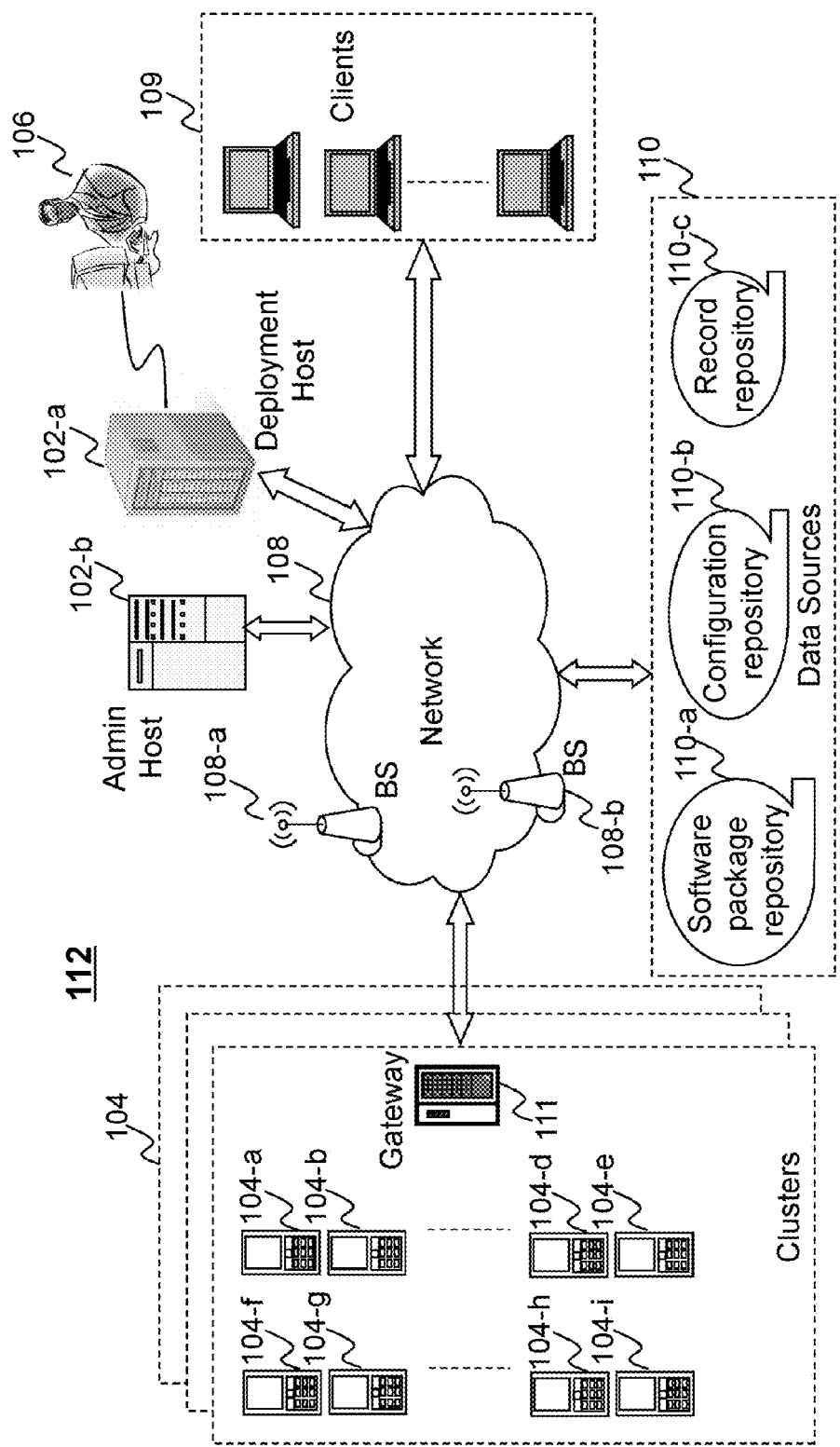
Figure 1C:
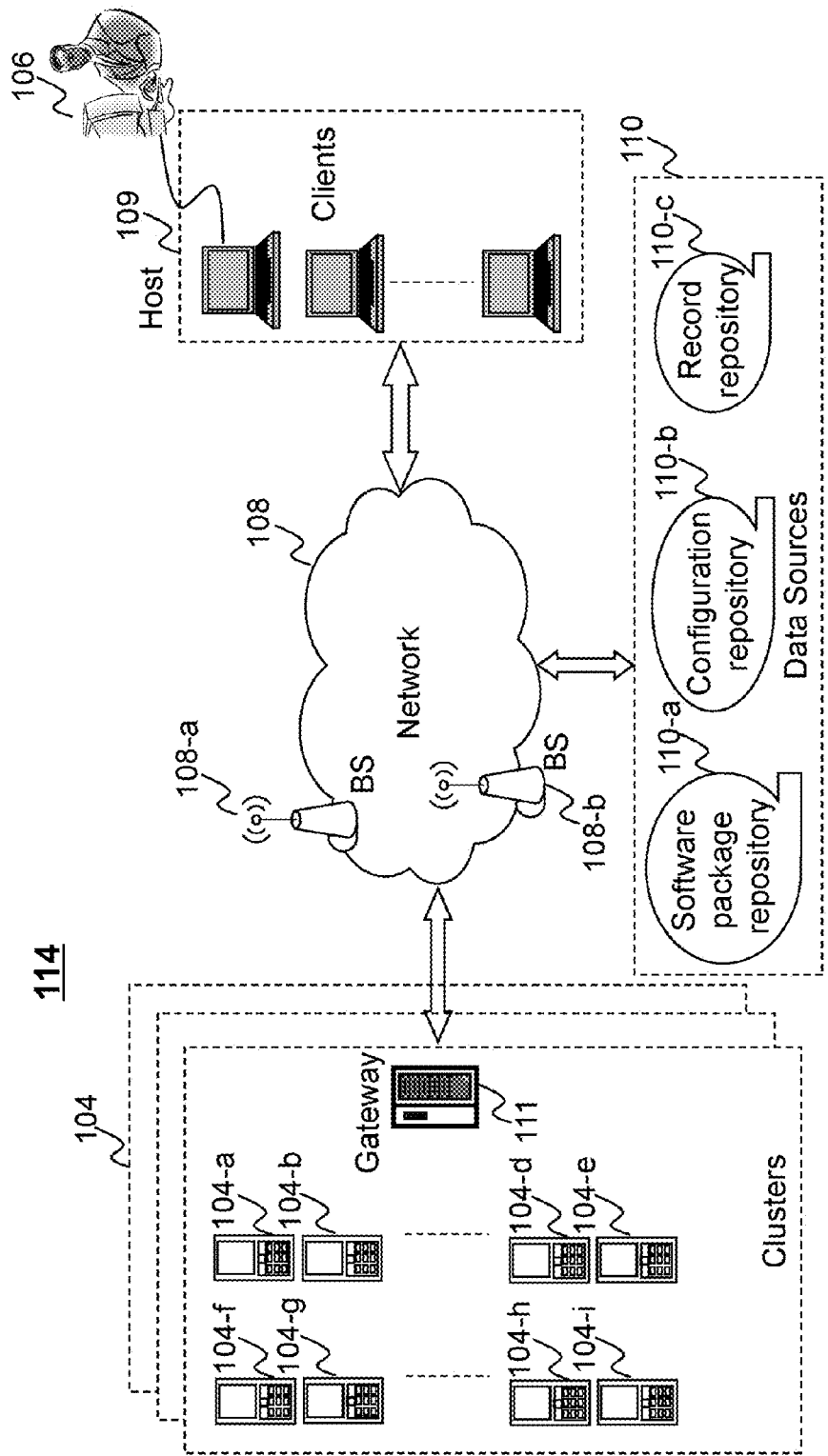

FIGS. 1(a)-1(c) depict high level exemplary system configurations in which multiple distributed application stacks can be automatically deployed on a target machine, according to an embodiment of the present teaching. In FIG. 1(a), the exemplary system 100 includes a host 102, a plurality of clusters 104, a user 106, a network 108, one or more client-side machines 109, and data sources 110, including a software package repository 110-a, a configuration repository 110-b, and a record repository 110-c. The network 108 may be a single network or a combination of different networks. For example, the network 108 may be a local area network (LAN), a wide area network (WAN), a public network, a private network, a proprietary network, a Public Telephone Switched Network (PSTN), the Internet, a wireless network, a virtual network, or any combination thereof. The network 108 may also include various network access points, e.g., wired or wireless access points such as base stations or Internet exchange points 108-a, . . . , 108-b, through which a data source may connect to the network in order to transmit information via the network.

Each of the clusters 104 in which one of multiple distributed application stacks is to be deployed may include a plurality of regular nodes 104-a, 104-b, . . . 104-h, 104-i, and at least one gateway node 111, which communicate through the network 108 or through an internal network (not shown). The gateway node 111 of the cluster 104 may be a special node that serves as an entry point and/or proxy when a user accesses the cluster 104. In this example, each node of the cluster 104 may be an autonomous physical machine, such as a server, a workstation, a desktop or laptop computer, a netbook, a tablet, a smart phone, a game console, or any other suitable machine. In another example, some or all of the nodes may be parallel virtual machines implemented by either software emulation or hardware virtualization. Each cluster 104 may be a set of machines owned by one entity, e.g., enterprise, and maintained as a server farm or server cluster where the servers are mounted on racks in a server room or data center. A cluster 104 may also be a collection of machines owned by different entities and that are physically separate from each other at a distance.

The data sources 110 include one or more databases on one or more servers for providing and storing information related to the multiple distributed application stacks deployment. For example, the software package repository 110-a is a storage location from which software packages may be retrieved and installed on the machines of the cluster 104 and the client-side machines 109. The configuration repository 110-b may keep the configuration information necessary for the multiple distributed application stacks deployment including, for example, the version of each software artifact of the distributed application stack and the type of each node of the cluster 104. The record repository 110-c may include a database storing all the records related to the multiple distributed application stacks deployment, including, for example, the status of each cluster node 104-*a*, 104-*b*, . . . 104-*h*, 104-*i*, and client-side machine 109 during the deployment (e.g., the version of each software artifact to be installed on a particular machine) and the result of the deployment for each cluster node 104-*a*, 104-*b*, . . . 104-*h*, 104-*i*, and client-side machine 109 (e.g., whether each software artifact has been properly installed on a particular machine and whether a diagnostic procedure has been performed and passed). It is understood that the data sources 110 may be maintained by the same entity that owns the cluster 104 or by a third-party, and may be implemented either on a single server having one or more databases or on multiple connected or unconnected servers.

In this exemplary system 100, a user 106, who may be a network administrator, operator, developer, or customer of the cluster 104, may send a request to the host 102 via an internal or proprietary network connection to automatically deploy multiple distributed application stacks on a target machine, e.g., a client-side machine 109 or a gateway node 111. For each distributed application stack, the host 102, in response to the request, may retrieve configuration information from the configuration repository 110-*b* of the data sources 110 and create an instruction for regular nodes of the cluster 104 and an instruction for the target machine based on the retrieved configuration information. Each regular node of the cluster 104 and the target machine, in accordance with the respective instruction received from the host 102, may fetch the appropriate software artifacts from the software package repository 110-*a* of the data sources 110 and install them onto the machine. In addition, the status and result of the deployment may be fully and automatically recorded and stored in the record repository 110-*c* of the data sources 110 during and/or after the deployment by the host 102 in conjunction with the cluster 104 and the client-side machines 109.

In this exemplary system 100, each client-side machine 109 may be, for example, a server, a workstation, a desktop or laptop computer, a netbook, a tablet, a smart phone, a game console, or any other suitable physical machine, which is outside the clusters 104 and can be customized and configured by the user. A user may access and interact with one or more clusters 104 through the client-side machine 109. A plurality of virtual environments isolated from each other may be created on a client-side machine 109 or a gateway node 111 such that a distributed application stack from the plurality of distributed application stacks may be deployed in a respective virtual environment and associated with a corresponding cluster 104 based on the deployed distributed application stack.

FIG. 1(*b*) presents a similar system configuration as what is shown in FIG. 1(*a*) except that the host 102 is now configured as two separate machines: a deployment host 102-*a* and an admin host 102-*b*. In this exemplary system 112, only the admin host 102-*b* has the super-user or administrator access privileges to all the machines of the cluster 104. The deployment host 102-*a* in this example may be any computing device serving as an interface for the user 106 to input the request of deployment.

FIG. 1(*c*) presents another similar system configuration as what is shown in FIG. 1(*a*) except that the host 102 is one of the client-side machines 109. In this exemplary system 114, the user 106 may be a customer who subscribes to the usage of the cluster 104 and intends to deploy multiple distributed application stacks on the clusters 104 and his/her own computer (i.e., a client-side machine 109) through his/her computer. It is noted that different configurations as illustrated in FIGS. 1(*a*)-1(*c*) can also be mixed in any manner that is appropriate for a particular application scenario.

Figure 2:
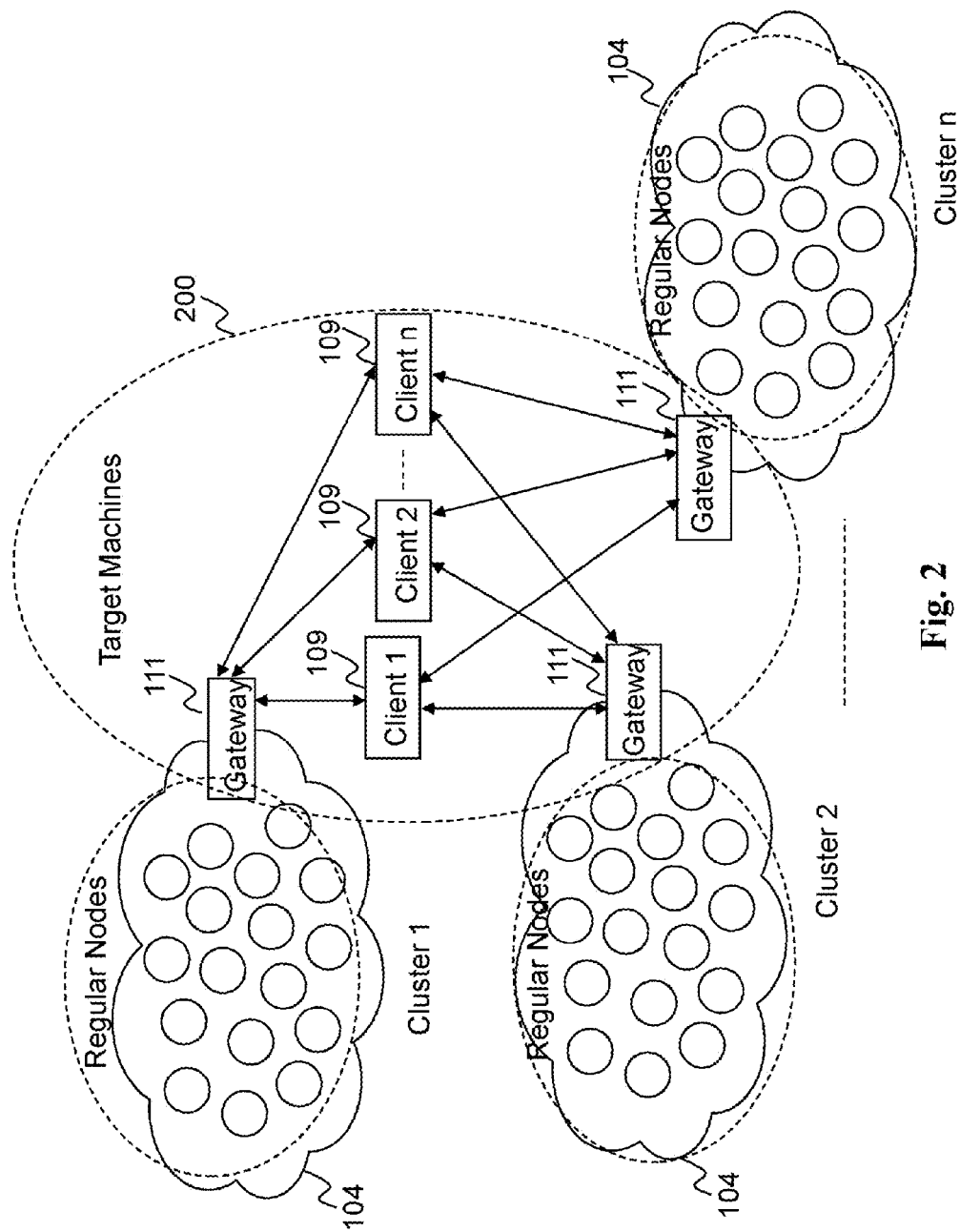
FIG. 2 is a depiction of multiple distributed application stacks deployment on a target machine, according to an embodiment of the present teaching.

FIG. 2 is a depiction of multiple distributed application stacks deployment on a target machine, according to an embodiment of the present teaching. In this example, the target machines 200 (e.g., lightweight HADOOP clients) include client-side machines 109 and gateway nodes 111. Each cluster 104 includes a plurality of regular nodes and at least one gateway node 111, which serves as an entry point and/or proxy for a client-side machine 109 to access the cluster 104. In this example, a plurality of distributed application stacks may be deployed on the regular nodes of the plurality of cluster 104, respectively, in a one-to-one mapping relationship. On each target machine 200, the plurality of distributed application stacks may be deployed on isolated environments such that a user can access and interact with any of the clusters 104 through a target machine 200.

FIG. 3(*a*) shows a more detailed high level exemplary system diagram of the system 100 shown in FIG. 1(*a*), according to a first application embodiment of the present teaching. In this exemplary embodiment, the system 100 includes a host 102, a target machine 200, at least one regular cluster node 104-*a* for each of multiple clusters 104, a software package repository 110-*a*, a configuration repository 110-*b*, and a record repository 110-*c*. The host 102 may receive a request 202 from a user in the form of, for example, a deployment form or a single-click submission. The request 202 may include a version of each distributed application stack to be deployed on a respective cluster 104, a description of each cluster 104, and an identifier of the target machine 200. In response to receiving the request 202, the host 102 may be responsible for retrieving configuration information 204 from the configuration repository 110-*b* based on the version of the distributed application stack and the description of the cluster 104 in the request 202. For example, the configuration information 204 may include a software configuration having the version of each software artifact of the distributed application stack and a cluster configuration having the type of each regular node 104-*a* of the cluster 104. The configuration information 204 may be stored and retrieved in various forms, such as but not limited to a XML file or a text file. Based on the retrieved configuration information 204, the host 102 may create an instruction 206-*a* for the regular cluster nodes 104-*a* and an instruction 206-*b* for the target machine 200. The instruction 206-*a* may be used to direct the regular cluster nodes 104-*a* to deploy at least one cluster-side software artifact in the distributed application stack from the software package repository 110-*a* onto the nodes; the instruction 206-*b* may be used to direct the target machine 200 to deploy at least one target-side software artifact from the software package repository 110-*a* in a virtual environment on the target machine 200. The instructions 206 may include executable code such as a script that can be executed by the machines 104-*a*, 200 and other information necessary for deployment. For example, such information may include association information between one or more software artifacts and each type of the machines 104-*a*, 200 and version information of the one or more software artifacts for each type of the machines 104-*a*, 200. The instruction 206-*b* may also include the identifier of the target machine 200, such as, but not limited to an IP address, a URL, a formal name, an alias, etc. The instructions 206 may be transmitted to the regular cluster nodes 104-*a* and the target machine 200. To deploy multiple distributed application stacks, the host 102 in one example, may create multiple instructions each of which is directed to deploy one of the multiple distributed application stacks. In another example, a single instruction 206 may be created for deploying more than one distributed application stacks.

Figure 3A:
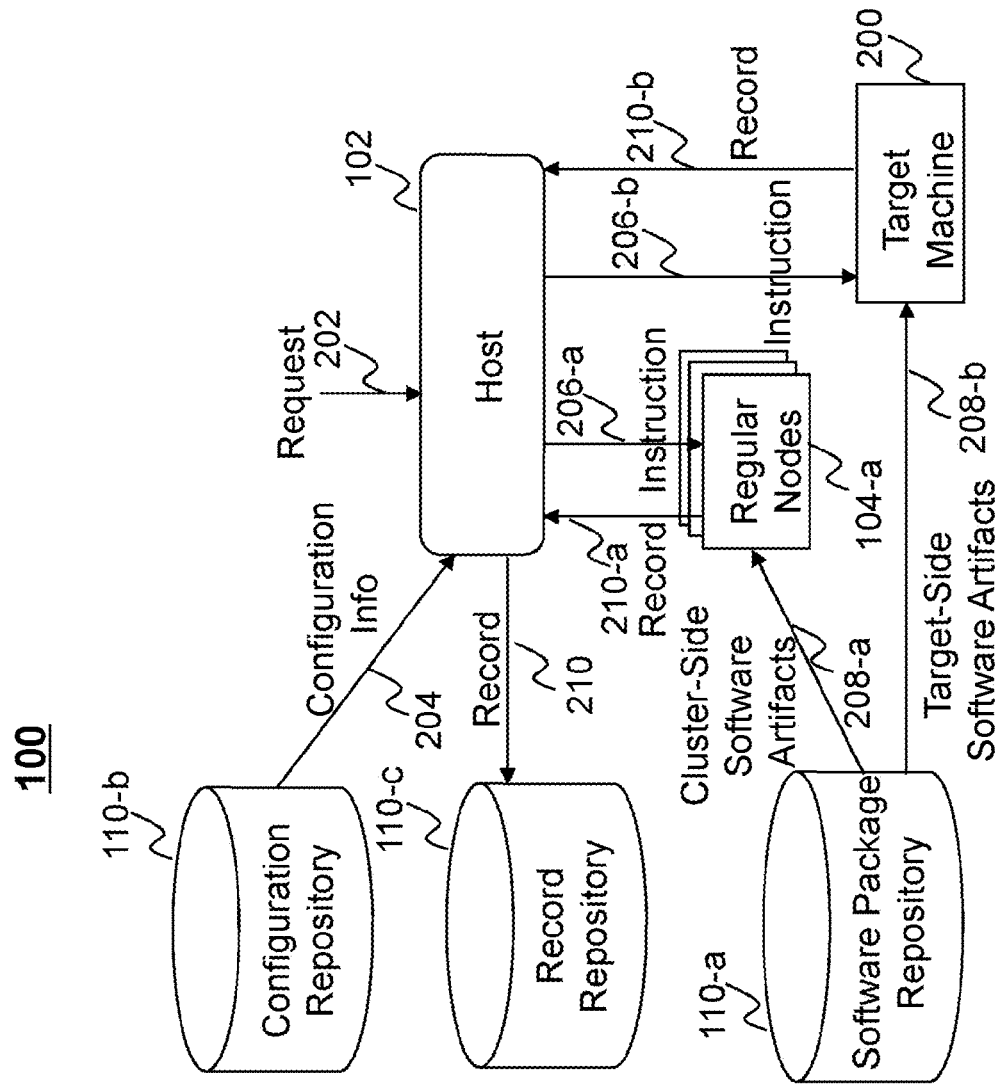
FIGS. 3(a)-3(c) are high level exemplary system diagrams of a system for automatically deploying a plurality of distributed application stacks on a target machine, according to an embodiment of the present teaching.

In this example, each regular cluster node 104-a in the same cluster 104 may receive the same generic instruction 206-a from the host 102. That is, it is unnecessary for the host 102 to create a customized instruction for each individual regular cluster node 104-a in the same cluster 104. Based on the received instruction 206-a, each regular cluster node 104-a may be responsible for identifying at least one cluster-side software artifacts 208-a from all the software artifacts of the distributed application stack for the respective regular cluster node 104-a. For example, for HADOOP deployment, the instruction 206-a may include cluster configuration indicating that one of the regular cluster nodes 104-a is a Name node and also include association information indicating a set of cluster-side software artifacts associated with a Name node. Accordingly, by executing the script in the instruction 206-a, the regular cluster node 104-a may identify its cluster-side software artifacts 208-a. Similarly, in another example, the regular cluster node 104-a may identify a different set of cluster-side software artifacts 208-a if the regular cluster node 104-a is a different type of regular node. There may be more than one version of each software artifact stored in the software package repository 110-a and thus, the version of each cluster-side software artifact 208-a to be deployed may also be determined by each regular cluster node 104-a based on the received instruction 206-a, for example, the version information as noted above. As shown in FIG. 3(a), for each distributed application stack, the cluster-side software artifacts 208-a in the determined versions may be fetched from the software package repository 110-a and installed onto the regular cluster nodes 104-a of a corresponding cluster 104. As noted above, in this example, all the operations on the regular cluster nodes 104-a may be automatically performed by executing the script in the received instruction 206-a with reference to the information in the instruction 206-a.

As to the target machine 200, the instruction 206-b may include an identifier of the target machine 200 and deployment information for directing deployment of one or more distributed application stacks on the same target machine 200. Similarly, for each distributed application stack, the deployment information may include association information indicating a set of target-side software artifacts associated with the target machine 200 and the version information of the set of target-side software artifacts. As shown in FIG. 3(a), for each distributed application stack, the target-side software artifacts 208-b in the determined versions may be fetched from the software package repository 110-a and installed onto the target machine 200.

In this example, the regular cluster nodes 104-a and the target machine 200 may be also responsible for transmitting records 210-a, 210-b to the host 102, which indicate the status and result of the software artifacts fetching and installation. The host 102 then may collect all the records 210-a, 210-b and store the records 210 into the record repository 110-c. The records 210 may be stored in the form of, for example, a log file or a TWiki page.

Figure 3B:
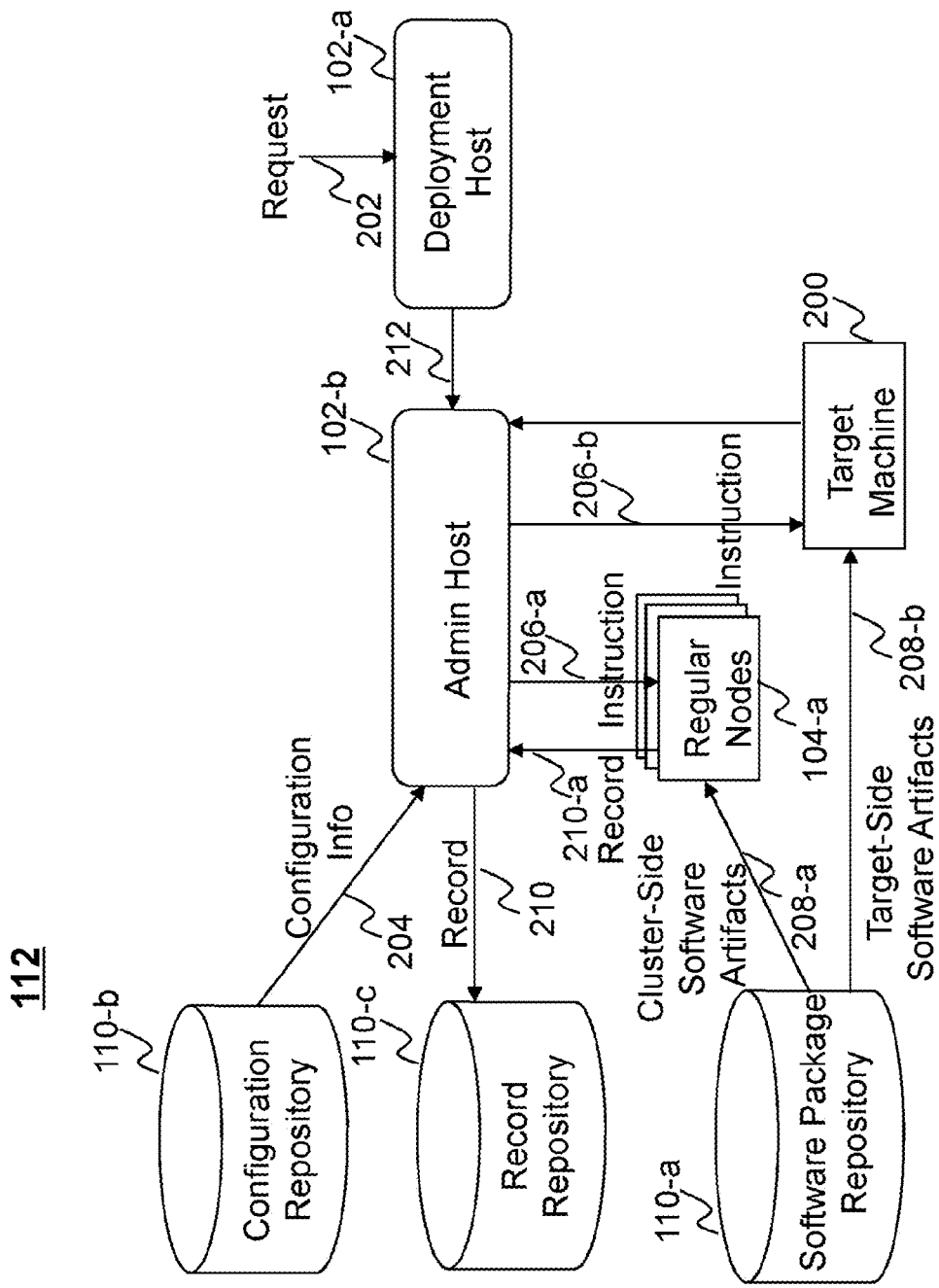

FIG. 3(b) shows a more detailed high level exemplary system diagram of the system 112 shown in FIG. 1(b), according to a second application embodiment of the present teaching. FIG. 3(b) presents a similar system configuration as what is shown in FIG. 3(a) except that the host 102 is now configured as two separate machines: a deployment host 102-a and an admin host 102-b. In this example, the deployment host 102-a may be responsible for receiving the deployment request 202 from a user. Since the deployment host 102-a may not have the access privilege to the cluster 104 and/or the data sources 110, in this example, the deployment host 102-a may generate an instruction 212, including executable code such as one or more scripts and information in the received request 202. The first script may log into the admin host 102-b and cause the admin host 102-b to execute the second script with reference to the information in the received request 202. The admin host 102-b then may perform all other functions of the host 102, as described in FIG. 3(a).

Figure 3C:
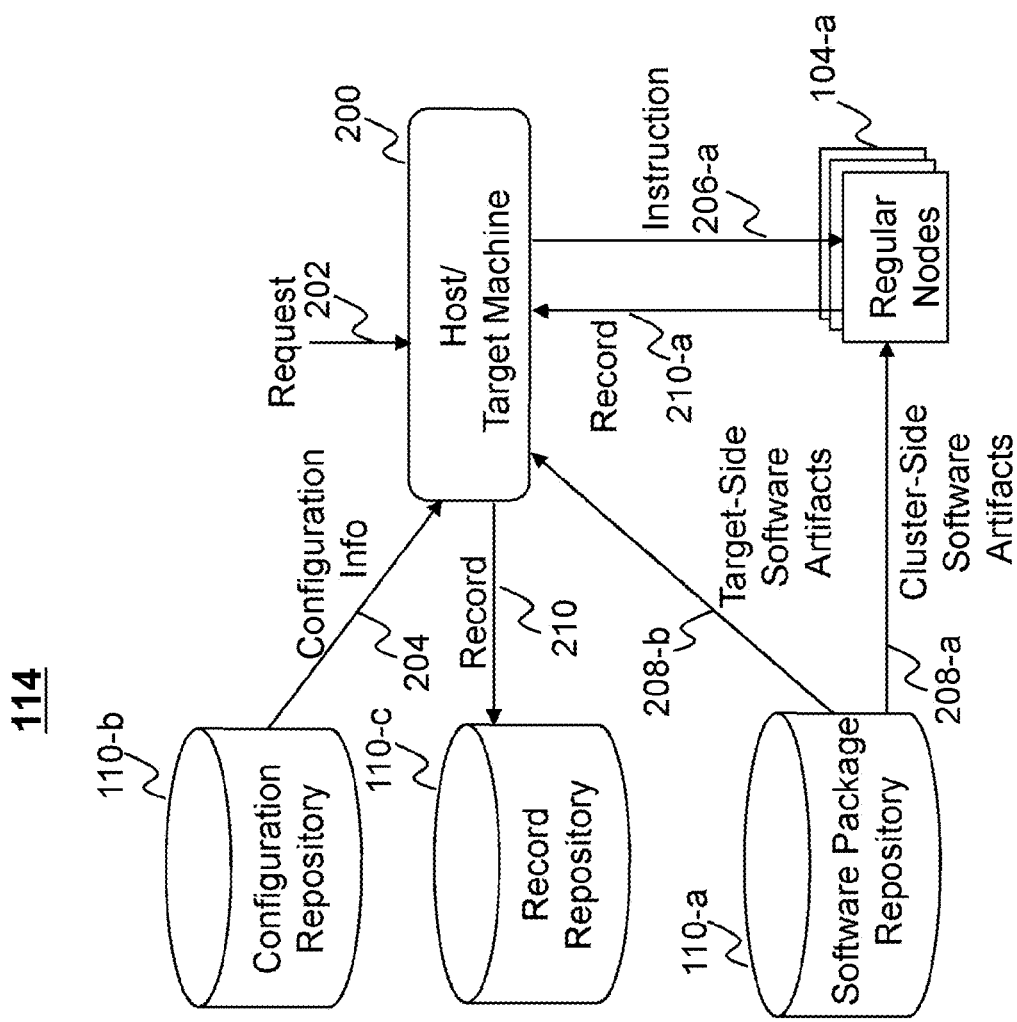

FIG. 3(c) shows a more detailed high level exemplary system diagram of the system 114 shown in FIG. 1(c), according to a third application embodiment of the present teaching. FIG. 3(c) presents a similar system configuration as what is shown in FIG. 3(a) except that the host is also the target machine 200. In this example, since the host is also the target machine 200, a set of target-side software artifacts 208-b may need to be deployed on the host. Different from the regular cluster nodes 104-a, the instruction 206-b and the record 210-b of the target machine 200 do not need to be transmitted through an outside network.

Figure 4:
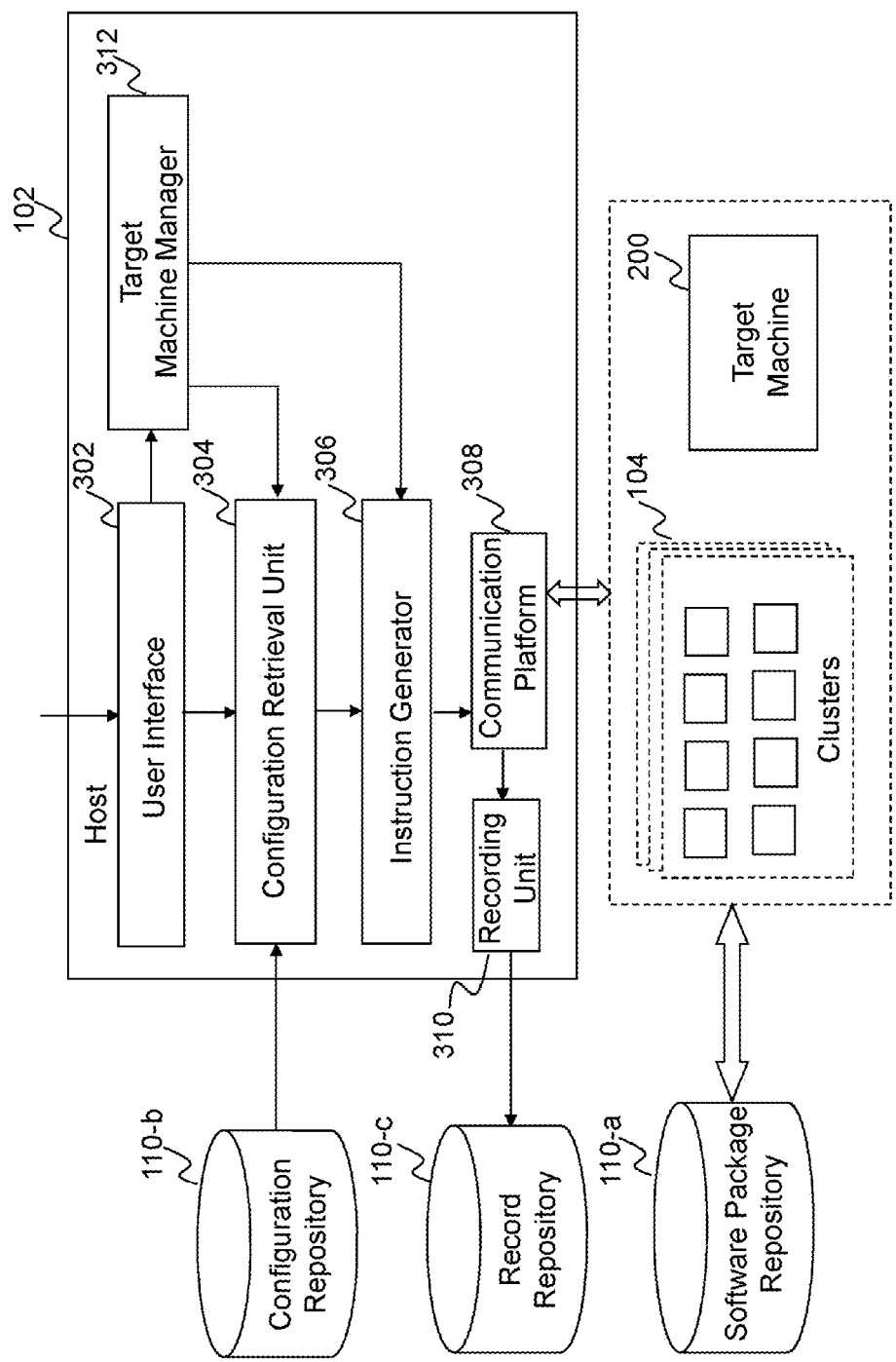
FIG. 4 is a depiction of an exemplary host of the system for automatically deploying a plurality of distributed application stacks on a target machine, according to an embodiment of the present teaching.

FIG. 4 depicts an exemplary system diagram of the host 102, according to an embodiment of the present teaching. In this exemplary embodiment, the host 102 acts as both a deployment host and an admin host. In this example, the host 102 includes a user interface 302, a configuration retrieval unit 304, an instruction generator 306, a communication platform 308, a recording unit 310, and a target machine manager 312. The user interface 302 is configured to receive a request from a user to deploy multiple distributed application stacks on a target machine 200. In one example, the user interface 302 is in the form of a deployment form, including a target machine field, a cluster field, a distributed application stack field, and a record field. The target machine field may receive the identifier of the target machine 200, for example, IP address "252.0.0.1." The cluster field may receive the description of one or more clusters in the form of, for example, an alias, for example, "hit2". The distributed application stack field may receive the version of one or more distributed application stacks, for example, "hit_0_20_203_0_11042713292_2." The record field may receive the location of the record repository 110-c, for example, at "hadoop-hit@yahoo-inc.com." It is understood that the record field may not be necessary in other examples and that the location of the record repository 110-c may be identified in other forms, such as but not limited to alias, ID, URL, etc. Since multiple distributed application stacks may be deployed on multiple clusters, the deployment form may also include the mapping between each received cluster description and the respective distributed application stack version. For example, the distributed application stack version "hit_0_20_203_0_1104271329_t2" may be specified in the deployment form to be deployed on cluster "hit2" and target machine "252.0.0.1", and another distributed application stack version "hit_0_30_203_0_1104271329_t1" may be deployed on another cluster "hit3" and on the same target machine "252.0.0.1." It is understood that the user interface 302 may be in any other suitable form, such as an interactive user interface, a single-click submission (for a default cluster/distributed application stack version), command lines, etc.

In this example, the configuration retrieval unit 304 is operatively coupled to the user interface 302 and the configuration repository 110-b. The configuration retrieval unit 304 is configured to, by executing executable code such as a script generated by the user interface 302 based on the received request, retrieve configuration information from the configuration repository 110-b. As noted above, the configuration information may include the version of each software artifact of the distributed application stack and the type of each regular cluster node.

In this example, the type of each regular cluster node may be obtained based on the received description of the cluster 104 from the user interface 302. For example, the cluster configuration may contain a full list of regular nodes participating in the cluster 104. For example, a node "gsb190949.blue.ygrid.yahoo.com" may be defined as a Name node, and a node "gsb190947.blue.ygrid.yahoo.com" may be defined as a Secondary node. It is understood that any other suitable form, for example IP address and alias, may be applied in other examples for identifying a cluster node. As noted above, the cluster configuration is associated with a specific description of a cluster (e.g., "hit2") and stored in the configuration repository 110-*b*. All the cluster configurations may have already been predefined by a user or a third-party in advance to the deployment. Depending on the specific descriptions of clusters, various cluster configurations may be retrieved by the configuration retrieval unit 304.

In this example, the version of each software artifact may also be obtained based on the received version of the distributed application stack from the user interface 302. As noted above, the version of each software artifact in a HADOOP stack may be determined based on the received version of the HADOOP stack in the distributed application stack field in the deployment form (e.g., "hit_0_20_203_0_1104271329_t2"). For example, the version of HADOOP Distributed File System (HDFS) Proxy in the specified version of HADOOP stack is 3.0.0.0.1104072227, and the version of Data Acquisition (DAQ) is 0.1.1104262128. Since some components of a HADOOP stack may include more than one software artifact, the version of each software artifact in those components may be separately defined. For example, a Hive component may include a client-side software artifact and a server-side software artifact having the same version of 0.0.7_6. In this example, all the software artifacts are in the version-controlled package formats, such as but not limited to Tape Archive (TAR), General Pubic License ZIP Archive (GZ), Cabinet (CAB), ZIP Archive (ZIP), Roshal Archive (RAR), etc. As noted above, the exemplary software configuration is associated with a specific version of the HADOOP stack ("hit_0_20_203_0_1104271329_t2") and stored in the configuration repository 110-*b*. All the software configurations may be automatically updated or manually input by a user or a third-party in advance to the deployment. Depending on the specific versions of distributed application stacks, various software configurations may be retrieved by the configuration retrieval unit 304. In another example, instead of receiving the version of the distributed application stack, some or all of the versions of the software artifacts in the distributed application stacks to be deployed may be specified directly through the user interface 302. In this situation, it may not be necessary to retrieve the full software configuration or may not be necessary to retrieve the software configuration at all from the configuration repository 110-*b*.

The version of the distributed application stack is orthogonal to the description of the cluster 104. That is, the description of the cluster 104 determines which conceptual role (type) each node plays (e.g. a Name node, a Secondary node, etc.), and the version of the distributed application stack (i.e. a set of software artifacts versions) specifies which specific versions of software artifacts will be deployed on each particular node, so that the node can carry out its role.

In this example, the instruction generator 306 is operatively coupled to the configuration retrieval unit 304 and is configured to create deployment instructions for the regular nodes of the cluster 104 and the target machine 200 based on the retrieved configuration information. For example, the instruction generator 306, by executing executable code such as a script, may read the cluster configuration and software configuration in the retrieved configuration information to generate association information between at least one software artifact and each type of the regular nodes. That is, each type of regular cluster nodes is mapped to a set of software artifacts that are necessary for the particular type of cluster nodes to act properly. Although it is usually not necessary to further map each individual cluster node to a set of software artifacts at the host side, in some examples, such mapping may be performed by the instruction generator 306 of the host 102.

The instruction generator 306 may also generate version information of the at least one cluster-side software artifact for each type of regular nodes. That is, the version of each software artifact for each type of regular nodes may be identified based on the software configuration. Optionally, in generating such version information, the instruction generator 306 may further check the latest version of each software artifact from the software package repository 110-*a* or from any other suitable source to determine if the current version specified in the retrieved software configuration should be updated. For example, the instruction generator 306 may determine that the version of a Nova component (1.1.1.2) retrieved from the configuration repository 110-*b* may be not up to date and that a latest version 1.1.2.1 of Nova may be available in the software package repository 110-*a*. In this situation, the instruction generator 306 may further determine whether the latest version of Nova should replace the retrieved version in the version information by considering various factors, such as but not limited to compatibility, reliability, completeness, audit, certification, and compliance. The instruction generator 306 may optionally request the confirmation from the user or the cluster administrator to update one or more software artifacts to the latest versions in the version information in the instruction and/or the software configuration in the configuration information.

The instruction generator 306 is further configured to provide the instruction by including the association information and the version information into the instruction. The cluster configuration, as part of the configuration information retrieved by the configuration retrieval unit 304, may be incorporated into the association information or separately included into the instruction by the instruction generator 306. Optionally, as noted above, the instruction generator 306 may also provide executable code, such as a script, as part of the instruction. The instruction in this example may be created by the instruction generator 306 in the form of a compressed or non-compressed software package. In this example, the instruction generator 306 is also configured to cause the communication platform 308 to transmit the instruction to each regular node of the cluster 104.

In this example, the target machine manager 312 is operatively coupled to the user interface 302, the configuration retrieval unit 304, and the instruction generator 306. The target machine manager 312 is configured to facilitate the configuration retrieval unit 304 and the instruction generator 306 to generate an instruction for directing the deployment of multiple distributed application stacks on the target machine 200. In one example, based on the identifier of the target machine 200 in the request, the target machine manager 312 may assist the configuration retrieval unit 304 to retrieve version information for the specific target machine and assist the instruction generator 306 to incorporate the retrieved information into the instruction. Each distributed application stack may include a plurality of cluster-side software artifacts (e.g., server-side software artifacts) to be deployed on regular nodes of the clusters 104 and a plurality of target-side software artifacts (e.g., client-side software artifacts) to be deployed on the target machine 200. In one example, some software artifacts may only need to be deployed on the regular cluster nodes or only on the target machine. In another example, some software artifacts may have both a cluster-side version and a target-side version. In an example noted above, a Hive component in a HADOOP stack may include a cluster-side software artifact and a target-side artifact having the same version of 0.0.7_6. Accordingly, the target machine manager 312 may assist the configuration retrieval unit 304 to retrieve the version information for the target-side software artifacts to be deployed on the target machine 200.

As noted above, since the deployment of multiple distributed application stacks on multiple clusters 104 may have a one-to-one mapping relationship while the deployment of multiple distributed application stacks on a target machine 200 may have a multiple-to-one mapping relationship, the target machine manager 312 may be also responsible for recording all the mapping relationship between each distributed application stack and a respective cluster and causing the instruction generator 306 to include such information in the instruction to be sent to the target machine 200. For example, distributed application stacks 1-n may be requested to be deployed on cluster 1-n, respectively, in a single request or multiple requests, and such information may be recorded by the target machine manager 312. Some distributed application stacks 1-m (m≤n) may be also requested to be deployed on a target machine 200. In this situation, the target machine manager 312 may include the mapping relationship between distributed application stacks 1-m and the cluster 1-m in the deployment instruction for the target machine 200. In addition, the target machine manager 312 may add location of the target machine 200 into the instruction. If the deployment request includes more than one target machine 200, the target machine manager 312 may be also responsible for managing the deployment on different target machines 200. It is noted that since the gateway node 111 of a cluster 104 is considered as a target machine in the present teaching, the deployment instruction for the gateway node 111 is different from other regular nodes of the cluster 104 and may be also created by the target machine manager 312 in conjunction with the configuration retrieval unit 304 and the instruction generator 306.

In this example, the recording unit 310 is operatively coupled to the communication platform 308 and the record repository 110-c. The recording unit 310 is configured to receive, through the communication platform 308, the record from each regular node of the cluster 104 and the target machine 200 indicating the status during the deployment and/or the result after the deployment for the respective machine. In this example, the recording unit 310 is also configured to consolidate all the received records and store them in the record repository 110-c. It is understood that although the record repository 110-c in FIG. 4 is remote from the host 102, in other examples, the record repository 110-c may be part of the host 102.

Figure 5:
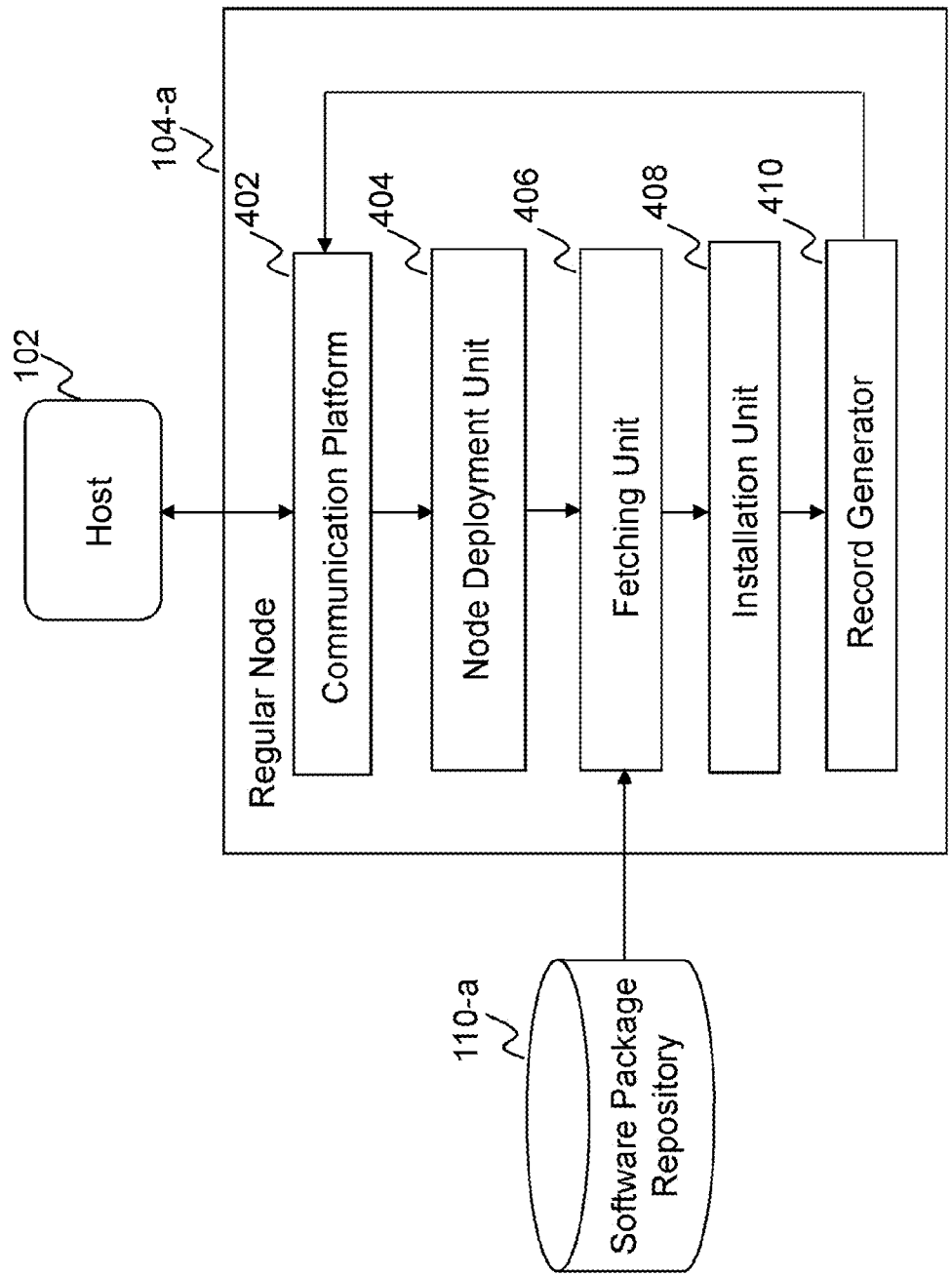
FIG. 5 is a depiction of an exemplary regular cluster node of the system for automatically deploying a plurality of distributed application stacks on a target machine, according to an embodiment of the present teaching.

FIG. 5 depicts an exemplary system diagram of the regular cluster node 104-a, according to an embodiment of the present teaching. In this exemplary embodiment, the regular cluster node 104-a includes a communication platform 402, a node deployment unit 404, a fetching unit 406, an installation unit 408, and a record generator 410. The communication platform 402 receives the deployment instruction from the host 102 and forwards the instruction to the node deployment unit 404. If the instruction is received in the form of a software package, the instruction may be first unpackaged into the local file system of the regular cluster node 104-a. In this example, the node deployment unit 404 is configured to identify at least one cluster-side software artifact from the plurality of software artifacts for the specific regular cluster node 104-a based on the instruction, for example, the association information as noted above. For example, the association information in the instruction may associate the Secondary node type of cluster nodes to a particular set of software artifacts in the distributed application stack. The script in the instruction may be executed by the node deployment unit 404 to identify that the regular cluster node 104-a is a Secondary type cluster node according to the cluster configuration, which may be part of the association information. The node deployment unit 404 may further identify the set of cluster-side software artifacts to be installed on the regular cluster node 104-a according to the mapping in the association information. In this example, the node deployment unit 404 is also configured to determine the version of each identified cluster-side software artifact based on the instruction, for example, the version information.

In this example, the fetching unit 406 is operatively coupled to the software package repository 110-a and the node deployment unit 404. The fetching unit 406 is configured to fetch the identified at least one cluster-side software artifact in the determined version from the software package repository 110-a. The fetching may be performed by the fetching unit 406 under any suitable protocols known in the art, such as but not limited to File Transfer Protocol (FTP), Secure Copy Protocol (SCP), Secure Shell (SSH), Peer-to-Peer (P2P), etc. In this example, each software artifact is stored in a version-controlled package format in the software package repository 110-a. A version-controlled package format may be, for example, a compressed TAR file or any other suitable file containing all files for a given software artifact. The package may also contain several manifest files describing component versions and other component-related information. An integral feature of this package system is a server-based repository of all the packages. Once a package is created, it is uploaded to the software package repository 110-a. From this point on, the package may be permanently kept in the software package repository 110-a and associated with a version that was given to it at its creation time. This guarantees that the association between the software package and the version is permanent and immutable. Accordingly, each software artifact may be stored in the software package repository 110-a under various versions, and the fetching unit 406 may fetch the version that is determined by the node deployment unit 404 based on the instruction from the host 102.

In this example, the installation unit 408 is operatively coupled to the fetching unit 406 and configured to install the fetched cluster-side software artifacts onto the machine. If the cluster-side software artifacts are in the version-controlled package format, the installation unit 408 may unpack all the files into the local file system of the regular cluster node 104-a before installation. The installation unit 408 may further perform any suitable operation specific to the particular type of node to complete the installation. The record generator 410 is operatively coupled to the installation unit 408 and is configured to cause the communication platform 402 to transmit the deployment record to the host 102. For example, the record generator 410 may record all the information related to the deployment, such as the name, version, installation time, and size of each software artifact installed on the machine and whether the installation of each software artifact was successful. The record may be generated in the form of, for example, a log file or a TWiki page. The record generator 410 may optionally run a node-type specific test to verify whether the installation has been successful and record the test result as well.

Figure 6:
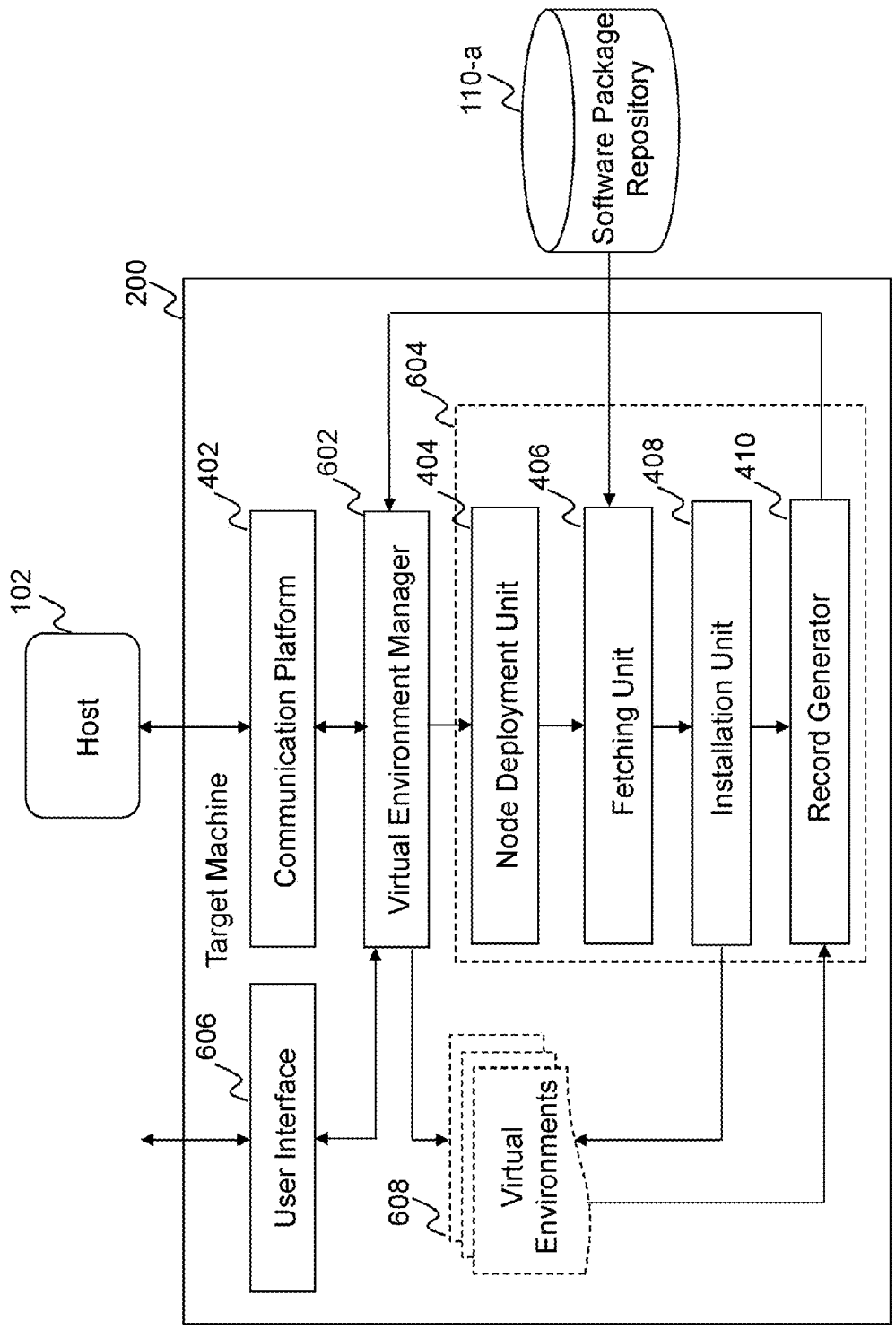
FIG. 6 is a depiction of an exemplary target machine of the system for automatically deploying a plurality of distributed application stacks on a target machine, according to an embodiment of the present teaching.

FIG. 6 depicts an exemplary system diagram of the target machine 200, according to an embodiment of the present teaching. In this exemplary embodiment, the target machine 200 includes a communication platform 402, a virtual environment manager 602, a deployment module 604, and a user interface 606. The communication platform 402 receives the deployment instruction from the host 102 and forwards the instruction to the virtual environment manager 602. If the instruction is received in the form of a software package, the instruction may be first unpackaged into the local file system of the target machine 200. The user interface 606 in this example is an interface between the virtual environment manager 602 and the user of the target machine 200. In one example, the user interface 606 may present a selection of multiple distributed application stacks deployed on the target machine 200 to the user and receive a request from the user to access one of clusters that is associated with the corresponding selected distributed application stack. The request may be forwarded to the virtual environment manager 602.

In this example, the virtual environment manager 602 is configured to create a plurality of virtual environments 608 isolated from each other on the target machine 200 through which a user has access to the plurality of clusters 104. Each virtual environment 608 may be labeled with an identifier. A virtual environment 608 may be a means for delivering resources that have been decoupled from physical machinery, thereby more efficiently utilizing resources while avoiding costly over-provisioning. The virtual environments 608 in this example may be process or application virtual environments that run as normal applications inside a host operating systems and support a single process. In other examples, the virtual environments 608 may be system virtual environments that provide complete system platforms which support the execution of a complete operating system. Nevertheless, one characteristic of a virtual environment 608 is that the software running inside is limited to the resources and abstractions provided by the virtual environments 608. In other words, multiple virtual environments 608 created on the same physical machine are isolated from each other. A virtual environment 608 may enable the running of virtual desktops, servers or other virtual machines. For example, a virtual machine is a completely isolated guest operating system installation within a normal host operating system. Virtual environments may be implemented with either software emulation or hardware virtualization or both together, such as emulation of the underlying raw hardware, emulation of a non-native system, and operating system-level virtualization. In this example, at least one resource (e.g., computing resource, storage resource, communication resource, etc.) associated with the target machine 200 is allocated to each of the virtual environments 608, and the plurality of target-side software artifacts deployed in each virtual environment 608 are capable of accessing the at least one resource allocated to the virtual environment 608.

In this example, the deployment module 604 is operatively coupled to the virtual environment manager 602 and is configured to deploy a distributed application stack from the plurality of distributed application stacks in a virtual environment 608 created on the target machine 200. As noted above, the plurality of distributed application stacks are deployed in the plurality of clusters 104 (e.g., the regular nodes 104-*a* of each cluster 104). In this example, the deployments of the same distributed application stack (e.g., the same version of HADOOP stack) on the regular nodes 104-*a* and on the target machine 200 may occur at substantially the same time. That is, the host 102 transmits the deployment instructions to the regular nodes 104-*a* and the target machines 200 at substantially the same time. In order to deploy a distributed application stack on the target machine 200, one or more virtual environments 608 need to be created prior to the deployment. In one example, the virtual environment manager 602 may create a new virtual environment 608 once the deployment instruction is received. In another example, the virtual environment manager 602 may have created multiple virtual environments 608 in advance and assign one virtual environment 608 to each deployment upon receiving the deployment instruction. In deploying a distributed application stack, the deployment module 604 is further configured to receive an instruction to direct the deployment of at least one target-side software artifact from the software package repository 110-*a* into the virtual environment 608. The instruction may be created by the virtual environment manager 602 and includes an identifier for a specific virtual environment 608. As noted above, each distributed application stack may be identified by the version of the distributed application stack and thus, the instruction may be generated based on the version of the distributed application stack to be deployed on the specific virtual environment 608. In other words, the version of a distributed application stack may be associated with the identifier of a virtual environment 608, and such association information may be included in the instruction.

In this example, the deployment module 604 includes a node deployment unit 404, a fetching unit 406, an installation unit 408, and a record generator 410. Each unit of the deployment module 604 may perform the similar function of a counterpart unit in FIG. 5. For example, the node deployment unit 404 is configured to identify at least one target-side software artifact from the plurality of target-side software artifacts for the virtual environment 608 based on the instruction and determine a version of the at least one target-side software artifact for the virtual environment 608 based on the instruction; the fetching unit 406 is configured to fetch the at least one target-side software artifact in the determined version from the software package repository 110-*a* to the target machine 200; the installation unit 408 is configured to install the at least one target-side software artifact in the determined version in the virtual environment 608 of the target machine 200 that is identified by the identifier in the instruction; the record generator 410 is configured to run test and recording procedures to verify whether the installation has been successful and record the test result.

Figure 8:
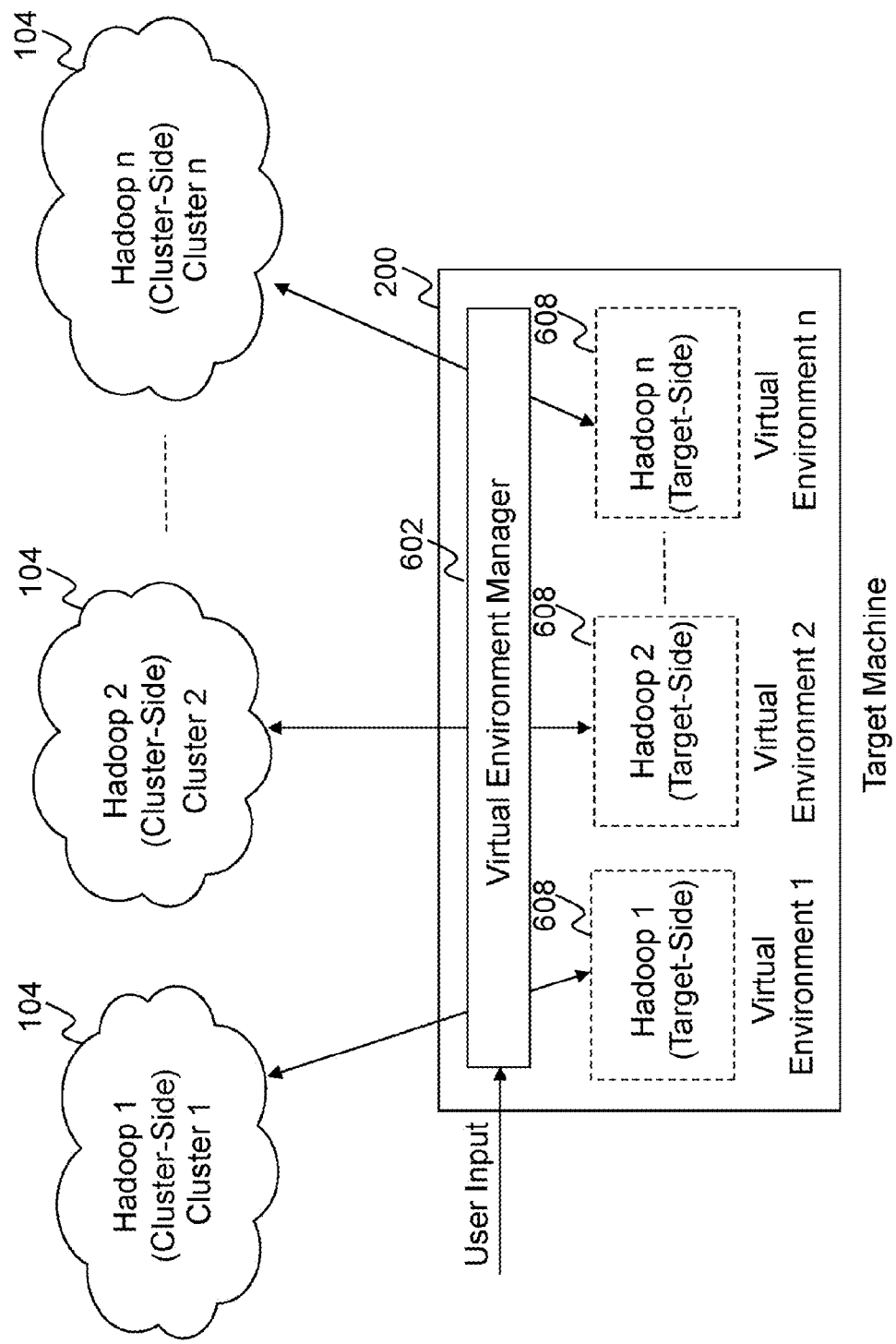
FIG. 8 is a depiction of association between each virtual environment on a target machine and a corresponding cluster based on deployed distributed application stacks, according to an embodiment of the present teaching.

In this example, the virtual environment manager 602 is further configured to associate each of the virtual environments 608 with a corresponding cluster 104 based on the deployed distributed application stack. In one example, the association is achieved based on the version of the deployed distributed application stack. Referring now to FIG. 8, for example, the target-side software artifacts of HADOOP 1 are deployed in virtual environment 1 on the target machine 200, and the cluster-side software artifacts of the same HADOOP 1 are deployed on the regular nodes of cluster 1. Thus, virtual environment 1 is then associated with cluster 1 by the virtual environment manager 602 in this example. Similarly, virtual environment 2 may be associated with cluster 2 because they are deployed with the same version of HADOOP 2.

Referring back to FIG. 6, the virtual environment manager 602 is further configured to receive a request from the user to access one of the plurality of clusters 104 through the target machine 200. As noted above, the request may be received by the virtual environment manager 602 via the user interface 606. The virtual environment manager 602 is then responsible for identifying one of the plurality of virtual environments 608 created on the target machine 200 that is associated with the cluster 104 in accordance with the request. In this example, the identification may be achieved by finding the same version of a distributed application stack deployed both on a cluster 104 and in a virtual environment 608 created on the target machine 200. In this example, the virtual environment manager 602 is further configured to invoke the distributed application stack deployed in the identified virtual environment 608 such that the user may access and interact with the cluster 104 through the invoked distributed application stack.

Figure 7:
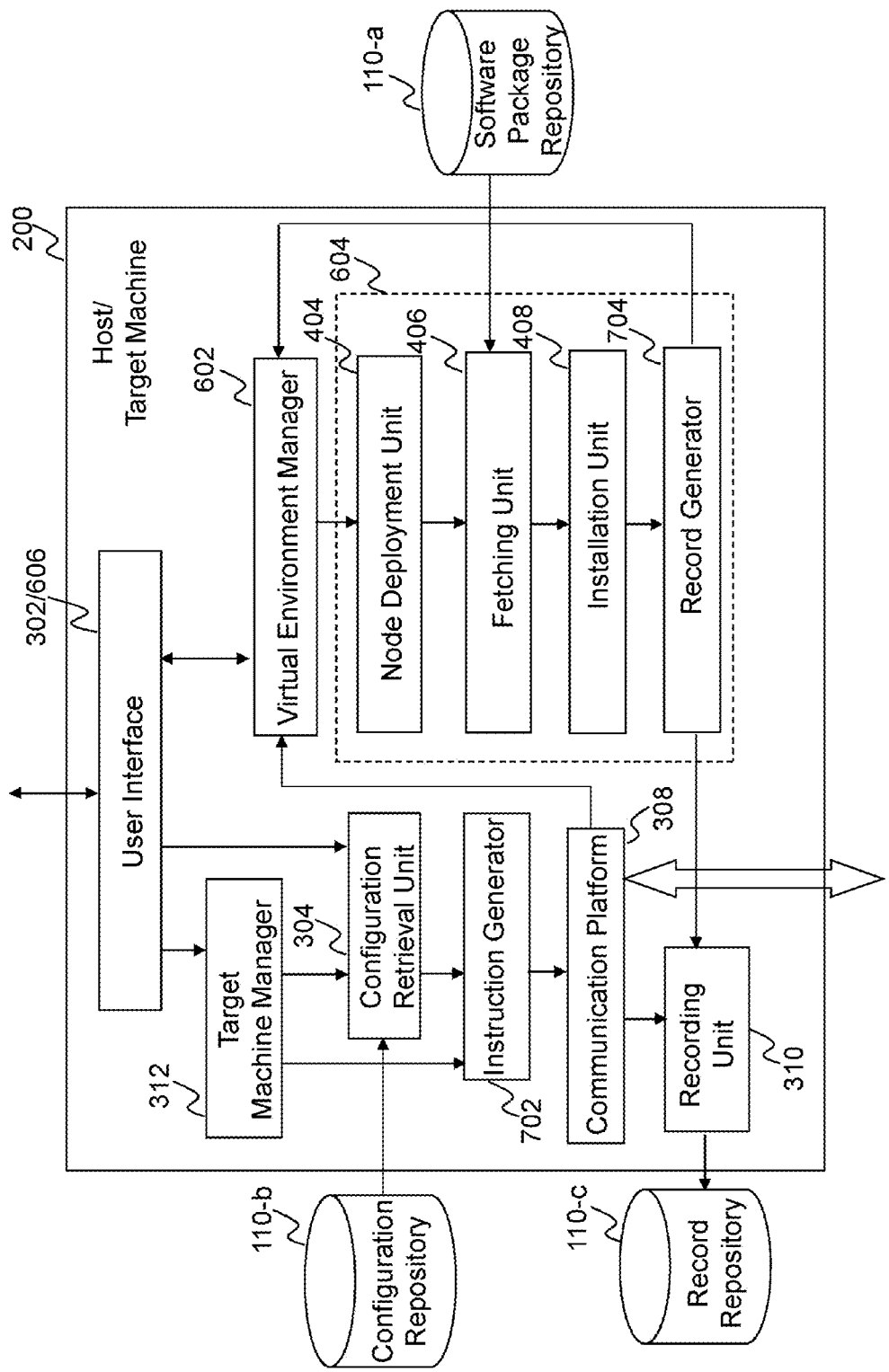
FIG. 7 is a depiction of an exemplary host/target machine of the system for automatically deploying a plurality of distributed application stacks on a target machine, according to an embodiment of the present teaching.

FIG. 7 depicts an exemplary system diagram of the host/target machine 200 according to an embodiment of the present teaching. In this exemplary embodiment, most of the units perform the similar functions of their counterpart units in FIGS. 5 and 6. The instruction generator 702 in this example, in addition to causing the communication platform 308 to transmit instructions to the regular nodes of the cluster 104, may directly forward an instruction to the node deployment unit 404 in the same machine. The record generator 704 in this example may directly forward the record to the recording unit 310.

Figure 9:
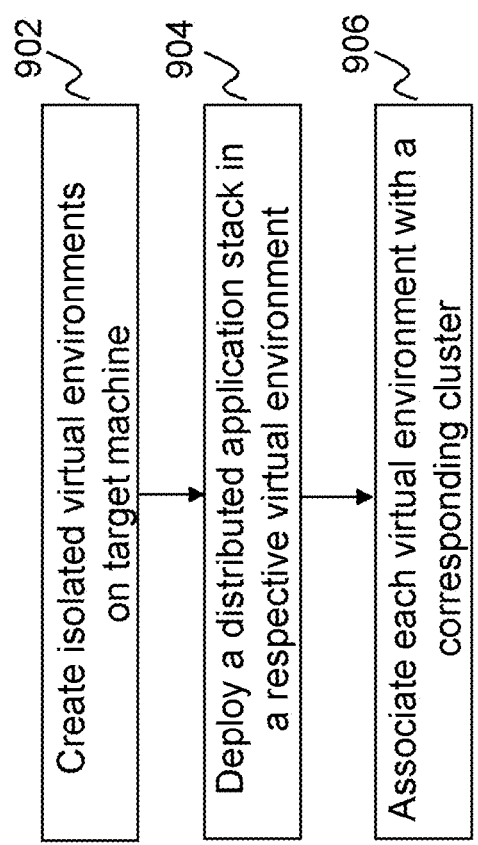
FIG. 9 is a flowchart of an exemplary process for automatically deploying a plurality of distributed application stacks on a target machine, according to an embodiment of the present teaching.

FIG. 9 is a flowchart of an exemplary process in which a plurality of distributed application stacks is automatically deployed on a target machine, according to an embodiment of the present teaching. Beginning at block 902, a plurality of virtual environments isolated from each other are created on the target machine through which a user has access to a plurality of clusters. As described above, this may be performed by the virtual environment manager 602 of the target machine 200. At block 904, processing may continue where a distributed application stack from the plurality of distributed application stacks is deployed in a virtual environment created on the target machine. The plurality of distributed application stacks are deployed in the plurality of clusters. As described above, this may be performed by the deployment module 604 of the target machine 200. At block 906, each of the virtual environments is associated with a corresponding cluster based on the deployed distributed application stack. As described above, this may be performed by the virtual environment manager 602 of the target machine 200.

Figure 10:
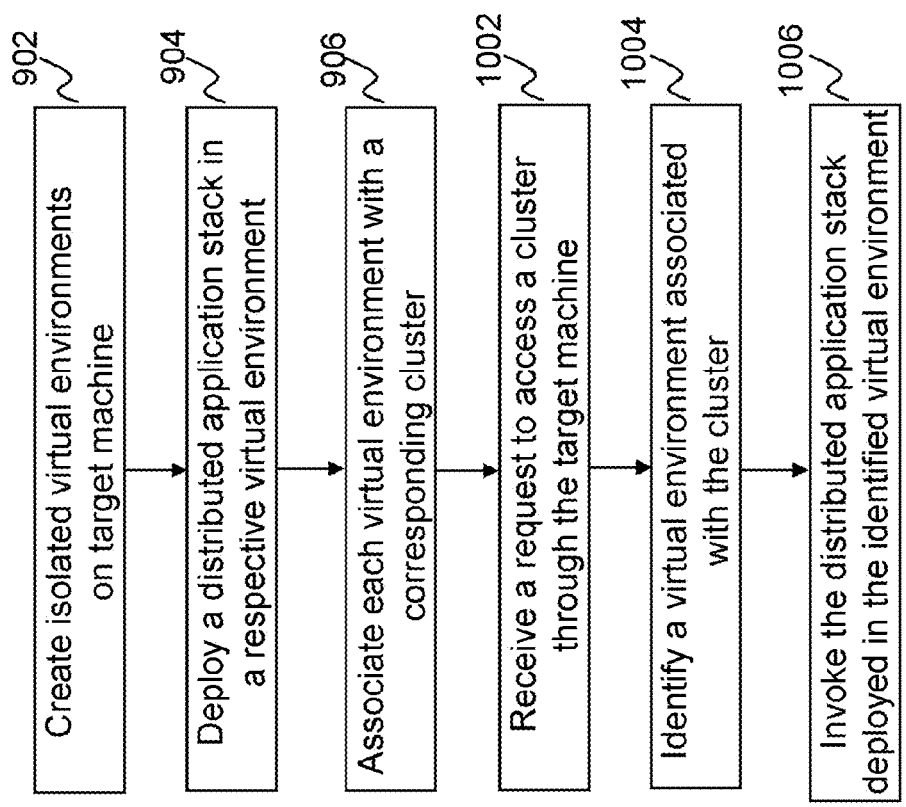
FIG. 10 is a flowchart of a more detailed exemplary process for automatically deploying a plurality of distributed application stacks on a target machine shown in FIG. 9, according to an embodiment of the present teaching.

FIG. 10 is a more detailed flowchart of an exemplary process in which a plurality of distributed application stacks is automatically deployed on a target machine, according to an embodiment of the present teaching. Blocks 902, 904, 906 may be performed as described above with reference to FIG. 9. Proceeding to block 1002, a request is received from a user to access one of the plurality of clusters through the target machine. At block 1004, one of the plurality of virtual environments created on the target machine is identified as being associated with the cluster in accordance with the request. At block 1006, the distributed application stack deployed in the identified virtual environment is invoked. As described above, blocks 1002, 1004, 1006 may be performed by the virtual environment manager 602 of the target machine 200.

Figure 11:
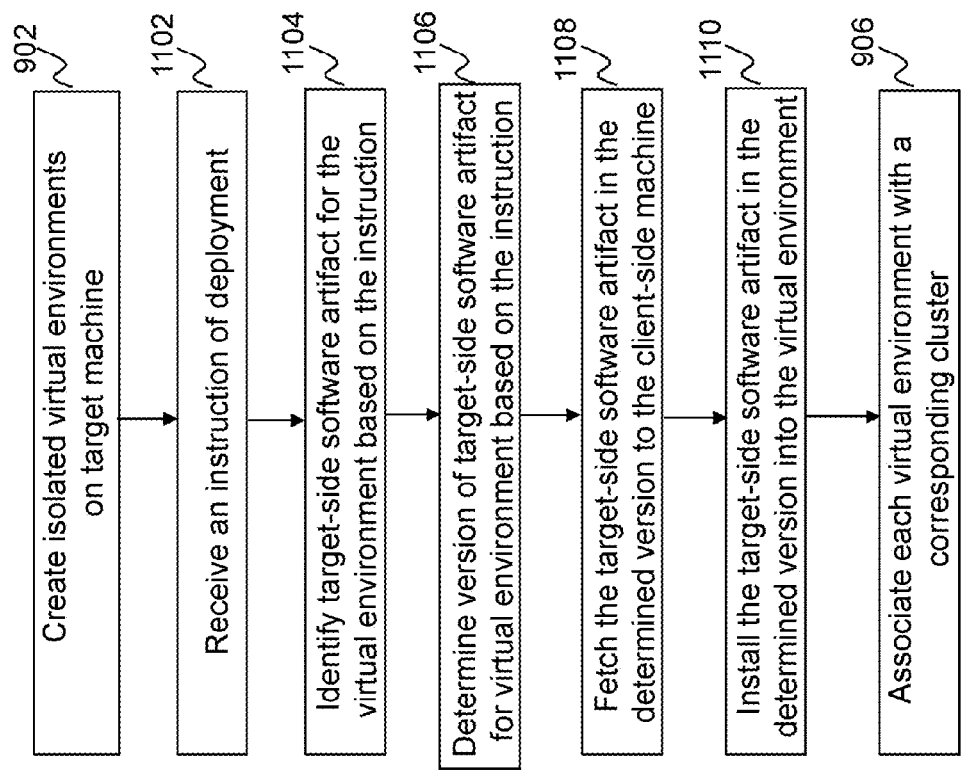
FIG. 11 is a flowchart of another more detailed exemplary process for automatically deploying a plurality of distributed application stacks on a target machine shown in FIG. 9, according to an embodiment of the present teaching.

FIG. 11 is a flowchart of another exemplary process in which a plurality of distributed application stacks is automatically deployed on a target machine, according to an embodiment of the present teaching. Beginning at block 902, a plurality of virtual environments isolated from each other are created on the target machine through which a user has access to a plurality of clusters. As described above, this may be performed by the virtual environment manager 602 of the target machine 200. At block 1102, processing may continue where an instruction is received to be used to direct the target machine to deploy at least one of the plurality of target-side software artifacts from a software package repository in the virtual environment. The instruction includes an identifier for the virtual environment. As described above, this may be performed by the deployment module 604 of the target machine 200. At block 1104, at least one target-side software artifact is identified from the plurality of target-side software artifacts for the virtual environment based on the instruction. At block 1106, a version of the at least one target-side software artifact for the virtual environment is determined based on the instruction. As described above, blocks 1104 and 1106 may be performed by the node deployment unit 404 of the target machine 200. Proceeding to block 1108, the at least one target-side software artifact is fetched in the determined version from the software package repository to the target machine. As described above, this may be performed by the fetching unit 406 of the target machine 200. At block 1110, the at least one target-side software artifact is installed in the determined version in the virtual environment of the target machine. As described above, this may be performed by the installation unit 408 of the target machine 200. At block 906, each of the virtual environments is associated with a corresponding cluster based on the deployed distributed application stack. As described above, this may be performed by the virtual environment manager 602 of the target machine 200.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 12:
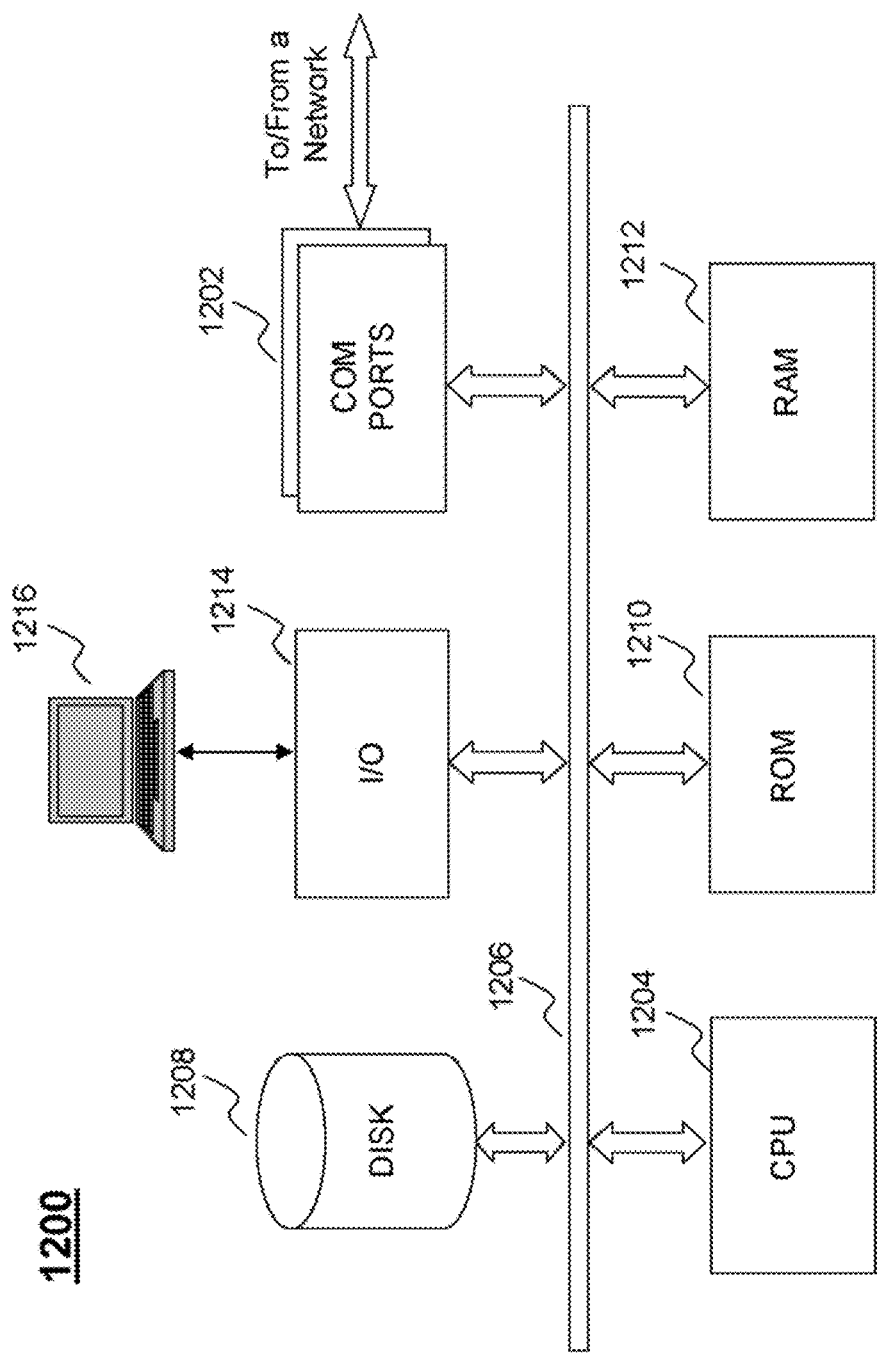
FIG. 12 depicts a general computer architecture on which the present teaching can be implemented.

FIG. 12 depicts a general computer architecture on which the present teaching can be implemented and has a functional block diagram illustration of a computer hardware platform that includes user interface elements. The computer may be a general-purpose computer or a special purpose computer. This computer 1200 can be used to implement any components of the architecture as described herein. Different components of the system 100, 112, 114, e.g., as depicted in FIGS. 1(a), 1(b), 1(c), 3(a), 3(b), and 3(c), can all be implemented on one or more computers such as computer 1200, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1200, for example, includes COM ports 1202 connected to and from a network connected thereto to facilitate data communications. The computer 1200 also includes a central processing unit (CPU) 1204, in the form of one or more processors, for executing program instructions. The exemplary computer platform includes an internal communication bus 1206, program storage and data storage of different forms, e.g., disk 1208, read only memory (ROM) 1210, or random access memory (RAM) 1212, for various data files to be processed and/or communicated by the computer, as well as possibly program instructions to be executed by the CPU. The computer 1200 also includes an I/O component 1214, supporting input/output flows between the computer and other components therein such as user interface elements 1216. The computer 1200 may also receive programming and data via network communications.

Hence, aspects of the method of automatically deploying a plurality of distributed application stacks on a target machine, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, implemented on at least one machine, each of the at least one machine having at least one processor, storage, and a communication platform connected to a network for automatically deploying a plurality of distributed application stacks on a target machine, the method comprising the steps of:
   in each of a plurality of clusters, deploying at least one cluster-side software artifact of one of the plurality of distributed application stacks, wherein the at least one cluster-side software artifact is associated with a version that uniquely identifies the distributed application stack which the at least one cluster-side software artifact belongs to;
   creating a plurality of virtual environments on the target machine through which a user has access to the plurality of clusters remotely, wherein the plurality of virtual environments are isolated from each other;
   in each of the plurality of virtual environments, deploying at least one target-side software artifact of one of the plurality of distributed application stacks, wherein the at least one target-side software artifact is associated with a version that uniquely identifies the distributed application stack which the at least one target-side software artifact belongs to; and
   associating each of the plurality of virtual environments with one of the plurality of clusters by matching the version of the at least one target-side software artifact deployed in the virtual environment with the version of the at least one cluster-side software artifact deployed in the cluster, wherein deploying at least one target-side software artifact comprises:
   receiving an instruction to be used to direct the target machine to deploy the at least one target-side software artifact in the virtual environment;
   identifying the at least one target-side software artifact from the plurality of target-side software artifacts for the virtual environment based on the instruction;
   determining the version of the at least one target-side software artifact for the virtual environment based on the instruction;
   fetching the at least one target-side software artifact in the determined version to the target machine; and
   installing the at least one target-side software artifact in the determined version in the virtual environment of the target machine.

2. The method of claim 1, further comprising:
   receiving a request from a user to access one of the plurality of clusters through the target machine;
   identifying one of the plurality of virtual environments created on the target machine that is associated with the cluster in accordance with the request; and invoking at least some of the target-side software artifacts in the distributed application stack deployed in the identified virtual environment.

3. The method of claim 1, wherein
at least one resource associated with the target machine is allocated to each of the virtual environments; and
the at least one target-side software artifact deployed in each virtual environment is capable of accessing the at least one resource allocated to the virtual environment.

4. The method of claim 1, wherein the instruction includes an identifier for the virtual environment.

5. The method of claim 1, wherein each of the target-side software artifacts and cluster-side software artifacts is in a version controlled package format.

6. A system having at least one processor, storage, and a communication platform connected to a network for automatically deploying a plurality of distributed application stacks on a target machine, comprising:
a deployment module implemented on the at least one processor and configured to
in each of a plurality of clusters, deploy at least one cluster-side software artifact of one of the plurality of distributed application stacks, wherein the at least one cluster-side software artifact is associated with a version that uniquely identifies the distributed application stack which the at least one cluster-side software artifact belongs to, and
in each of a plurality of virtual environments created on the target machine, at least one target-side software artifact of one of the plurality of distributed application stacks, wherein the at least one target-side software artifact is associated with a version that uniquely identifies the distributed application stack which the at least one target-side software artifact belongs to; and
a virtual environment manager implemented on the at least one processor and configured to:
create a plurality of virtual environments on the target machine through which a user has access to the plurality of clusters remotely, wherein the plurality of virtual environments are isolated from each other, and
associate each of the plurality of virtual environments with one of the plurality of clusters by matching the version of the at least one target-side software artifact deployed in the virtual environment with the version of the at least one cluster-side software artifact deployed in the cluster, wherein the deployment module comprises:
a node deployment unit configured to receive an instruction to be used to direct the target machine to deploy the at least one target-side software artifact in the virtual environment, identify the at least one target-side software artifact from the plurality of target-side software artifacts for the virtual environment based on the instruction, and determine the version of the at least one target-side software artifact for the virtual environment based on the instruction,
a fetching unit configured to fetch the at least one target-side software artifact in the determined version to the target machine, and
an installation unit configured to install the at least one target-side software artifact in the determined version in the virtual environment of the target machine.

7. The system of claim 6, wherein the virtual environment manager is further configured to:
receive a request from a user to access one of the plurality of clusters through the target machine;
identify one of the plurality of virtual environments created on the target machine that is associated with the cluster in accordance with the request; and
invoking at least some of the target-side software artifacts in the distributed application stack deployed in the identified virtual environment.

8. The system of claim 6, wherein
at least one resource associated with the target machine is allocated to each of the virtual environments; and
the at least one target-side software artifact deployed in each virtual environment is capable of accessing the at least one resource allocated to the virtual environment.

9. The system of claim 6, wherein the instruction includes an identifier for the virtual environment.

10. The system of claim 6, wherein each of the target-side software artifacts and cluster-side software artifacts is in a version controlled package format.

11. A machine-readable tangible and non-transitory medium having information recorded thereon for automatically deploying a plurality of distributed application stacks on a target machine, wherein the information, when read by the machine, causes the machine to perform the following:
in each of a plurality of clusters, deploying at least one cluster-side software artifact of one of the plurality of distributed application stacks, wherein the at least one cluster-side software artifact is associated with a version that uniquely identifies the distributed application stack which the at least one cluster-side software artifact belongs to;
creating a plurality of virtual environments on the target machine through which a user has access to the plurality of clusters remotely, wherein the plurality of virtual environments are isolated from each other;
in each of the plurality of virtual environments, deploying at least one target-side software artifact of one of the plurality of distributed application stacks, wherein the at least one target-side software artifact is associated with a version that uniquely identifies the distributed application stack which the at least one target-side software artifact belongs to; and
associating each of the plurality of virtual environments with one of the plurality of clusters by matching the version of the at least one target-side software artifact deployed in the virtual environment with the version of the at least one cluster-side software artifact deployed in the cluster, wherein deploying at least one target-side software artifact comprises:
receiving an instruction to be used to direct the target machine to deploy the at least one target-side software artifact in the virtual environment;
identifying the at least one target-side software artifact from the plurality of target-side software artifacts for the virtual environment based on the instruction;
determining the version of the at least one target-side software artifact for the virtual environment based on the instruction;
fetching the at least one target-side software artifact in the determined version to the target machine; and
installing the at least one target-side software artifact in the determined version in the virtual environment of the target machine.

12. The medium of claim 11, further comprising:
receiving a request from a user to access one of the plurality of clusters through the target machine;
identifying one of the plurality of virtual environments created on the target machine that is associated with the cluster in accordance with the request; and invoking at least some of the target-side software artifacts in the distributed application stack deployed in the identified virtual environment.

13. The medium of claim 11, wherein at least one resource associated with the target machine is allocated to each of the virtual environments; and the at least one target-side software artifact deployed in each virtual environment is capable of accessing the at least one resource allocated to the virtual environment.

14. The medium of claim 11, wherein the instruction includes an identifier for the virtual environment.

15. The medium of claim 11, wherein each of the target-side software artifacts and cluster-side software artifacts is in a version controlled package format.

\* \* \* \* \*